United States Patent
Zimmer et al.

(10) Patent No.: US 11,536,490 B2
(45) Date of Patent: Dec. 27, 2022

(54) WATER HEATER APPLIANCES AND METHODS OF SABBATH OPERATION

(71) Applicant: Haier US Appliance Solutions, Inc., Wilmington, DE (US)

(72) Inventors: Thomas Zimmer, La Grange, KY (US); Paul Goodjohn, Crestwood, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 219 days.

(21) Appl. No.: 16/928,428

(22) Filed: Jul. 14, 2020

(65) Prior Publication Data
US 2022/0018576 A1    Jan. 20, 2022

(51) Int. Cl.
*F24H 9/20* (2022.01)
*F24H 1/18* (2022.01)
*G05D 23/19* (2006.01)

(52) U.S. Cl.
CPC .......... *F24H 9/2021* (2013.01); *F24H 1/185* (2013.01); *G05D 23/1919* (2013.01)

(58) Field of Classification Search
None
See application file for complete search history.

(56) References Cited

U.S. PATENT DOCUMENTS

| 10,316,981 B2 | 6/2019 | Scott |
| 2007/0051819 A1 | 3/2007 | Isaacson |
| 2007/0261561 A1 * | 11/2007 | Grossbach .......... F24D 17/0031 99/275 |
| 2018/0245802 A1 | 8/2018 | Tadmor |

FOREIGN PATENT DOCUMENTS

| EP | 0920597 B1 * | 3/2002 | .......... F24H 9/0021 |
| WO | WO2019049181 A1 | 3/2019 | |

OTHER PUBLICATIONS

English translation of EP 0920597 B1 (Year: 2002).*

* cited by examiner

*Primary Examiner* — Steven S Anderson, II
*Assistant Examiner* — Kurt J Wolford
(74) *Attorney, Agent, or Firm* — Dority & Manning, P.A.

(57) ABSTRACT

A water heater appliance, as provided herein, may include a casing, a tank, an inlet conduit, an electric heating system, a mixing valve, and a controller. The electric heating system may be in thermal communication with the tank to heat water within the tank. The mixing valve mounted to the casing downstream from the tank. The controller may be operably coupled to the electric heating system and the mixing valve to initiate a Sabbath cycle. The Sabbath cycle may include determining an anticipated Sabbath condition at the water heater appliance, directing a lower portion of the tank of the water heater appliance to a sub-cooking Sabbath temperature below 45 degrees Celsius based on the anticipated Sabbath condition, determining the sub-cooking Sabbath temperature is met, and directing a mixing valve of the water heater appliance to a Sabbath set-point temperature in response to determining the sub-cooking Sabbath temperature is met.

20 Claims, 8 Drawing Sheets

WATER HEATER APPLIANCES AND METHODS OF SABBATH OPERATION

FIELD OF THE INVENTION

The present subject matter relates generally to water heater appliances, and more particularly to methods of operating water heater appliances during Sabbath

BACKGROUND OF THE INVENTION

Generally, Orthodox Jewish customs require that certain traditions be maintained during designated times. For instance, the Sabbath (i.e., Shabbos or Shabbat) is set aside as a time when no work should be performed. This prohibition on work may apply not only to an observer's direct physical actions, but also to actions initiated through the observer's appliances. For instance, a user may be required to abstain from causing an appliance to change its normal pattern of operation. In other words, the user may be prohibited from actions that would result in a direct response from the appliance, such as activating a heating element or heat-adjusting system. Nonetheless, many appliances are configured to provide this kind of direct response. In the field of water heater appliances, drawing water from a tank of the water heater appliance may cause a heating system to activate (e.g., directly based on a temperature measured for water within the tank). In some water heater appliances, the addition of water to the tank (e.g., following a draw therefrom) may cause new water to be "cooked" (e.g., in violation of the prohibition against bishul). Unfortunately, these actions may violate the sanctity of the day.

In order to properly observe Orthodox Jewish customs, some appliances provide a method of manually disabling certain functions. Other appliances adjust functions to be more in line with religious law. For instance, features that normally (e.g., at times other than the Sabbath) operate according to a measured condition may be instead operated according to a set timer for the duration of the Sabbath. In the case of water heater appliances, heating elements may be selectively turned on and off according to a basic timer or timed cycle.

Existing appliances, particularly water heater appliances, have numerous shortcomings for Sabbath operation. For instance, simply turning off certain heating elements or alternating activation according to a basic time or timed cycle may fail to adequately heat water at certain times. At other times, the generated heat may be excessive. For example, the heat or temperature of water within the tank may be in excess of the needs of a user, resulting in inefficient operation. Additionally or alternatively, the heat or temperature of water within the tank may cause added water to be cooked, resulting in Sabbath-incompliant operation.

As a result, it would be useful to provide a water heater appliance addressing one or more of the above-identified issues. In particular, it would be advantageous to provide a water heater appliance or method of operation with features for Sabbath-compliant operation (e.g., while efficiently or effectively ensuring an adequate supply of hot water is available for use).

BRIEF DESCRIPTION OF THE INVENTION

Aspects and advantages of the invention will be set forth in part in the following description, or may be obvious from the description, or may be learned through practice of the invention.

In one exemplary aspect of the present disclosure, a method of operating a water heater appliance is provided. The method may include determining an anticipated Sabbath condition at the water heater appliance. The method may further include directing a lower portion of a tank of the water heater appliance to a sub-cooking Sabbath temperature below 45 degrees Celsius based on the anticipated Sabbath condition. The method may still further include determining the sub-cooking Sabbath temperature is met at the lower portion of the tank and directing a mixing valve of the water heater appliance to a Sabbath set-point temperature in response to determining the sub-cooking Sabbath temperature is met at the lower portion of the tank.

In another exemplary aspect of the present disclosure, a water heater appliance is provided. The water heater appliance may include a casing, a tank, an inlet conduit, an electric heating system, a mixing valve, and a controller. The tank may be disposed within the casing. The tank may define an inlet and an outlet. The inlet conduit may be mounted to the tank at the inlet of the tank. The electric heating system may be in thermal communication with the tank to heat water within the tank. The mixing valve mounted to the casing downstream from the tank. The controller may be operably coupled to the electric heating system and the mixing valve. The controller may be configured to initiate a Sabbath cycle. The Sabbath cycle may include determining an anticipated Sabbath condition at the water heater appliance, directing a lower portion of the tank of the water heater appliance to a sub-cooking Sabbath temperature below 45 degrees Celsius based on the anticipated Sabbath condition, determining the sub-cooking Sabbath temperature is met at the lower portion of the tank, and directing a mixing valve of the water heater appliance to a Sabbath set-point temperature in response to determining the sub-cooking Sabbath temperature is met at the lower portion of the tank.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Figure 1:
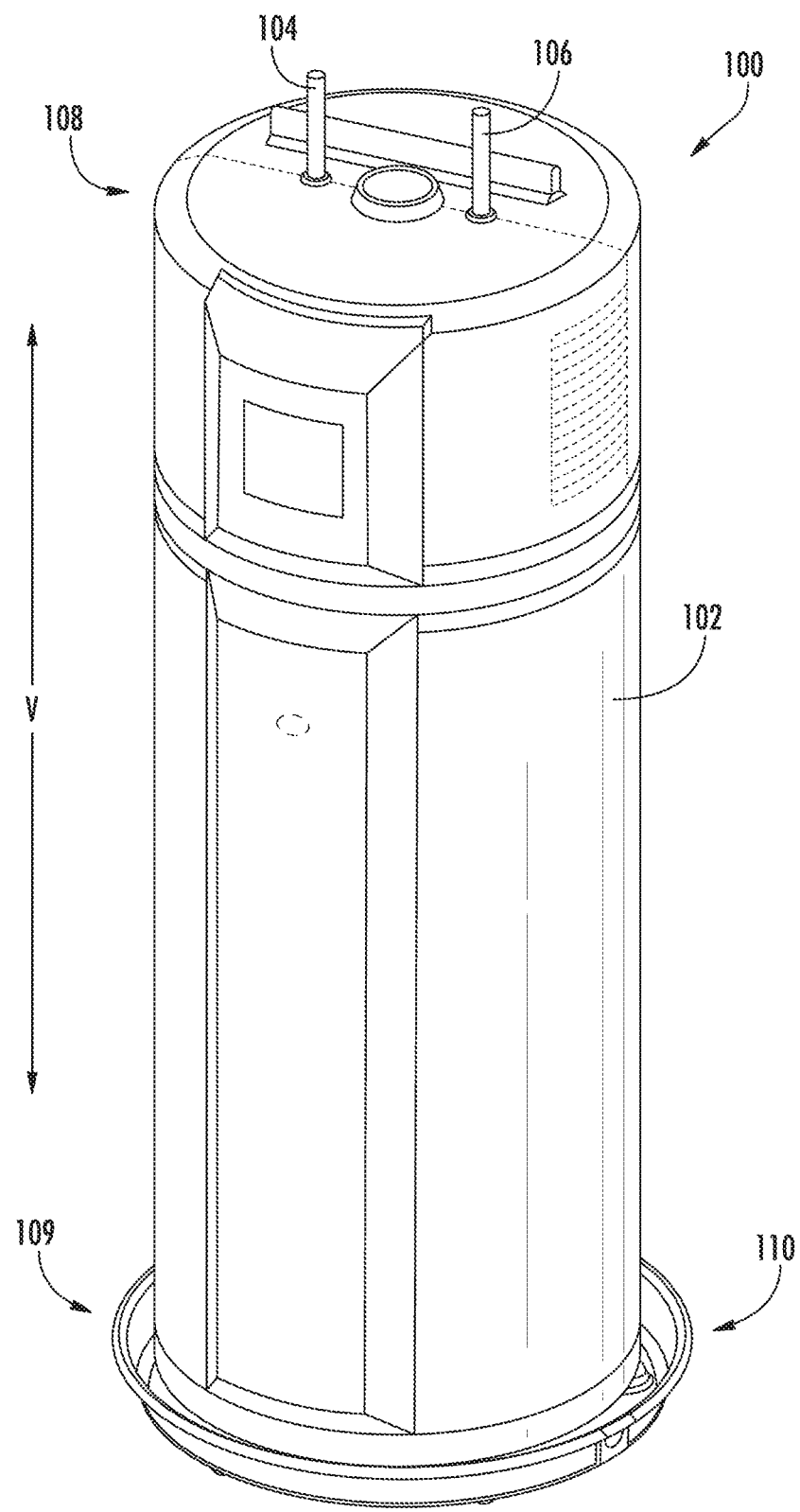
FIG. 1 provides a perspective view of a water heater appliance according to an exemplary embodiment of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the term "or" is generally intended to be inclusive (i.e., "A or B" is intended to mean "A or B or both"). The terms "first," "second," and "third" may be used interchangeably to distinguish one component from another and are not intended to signify location or importance of the individual components.

Figure 2:
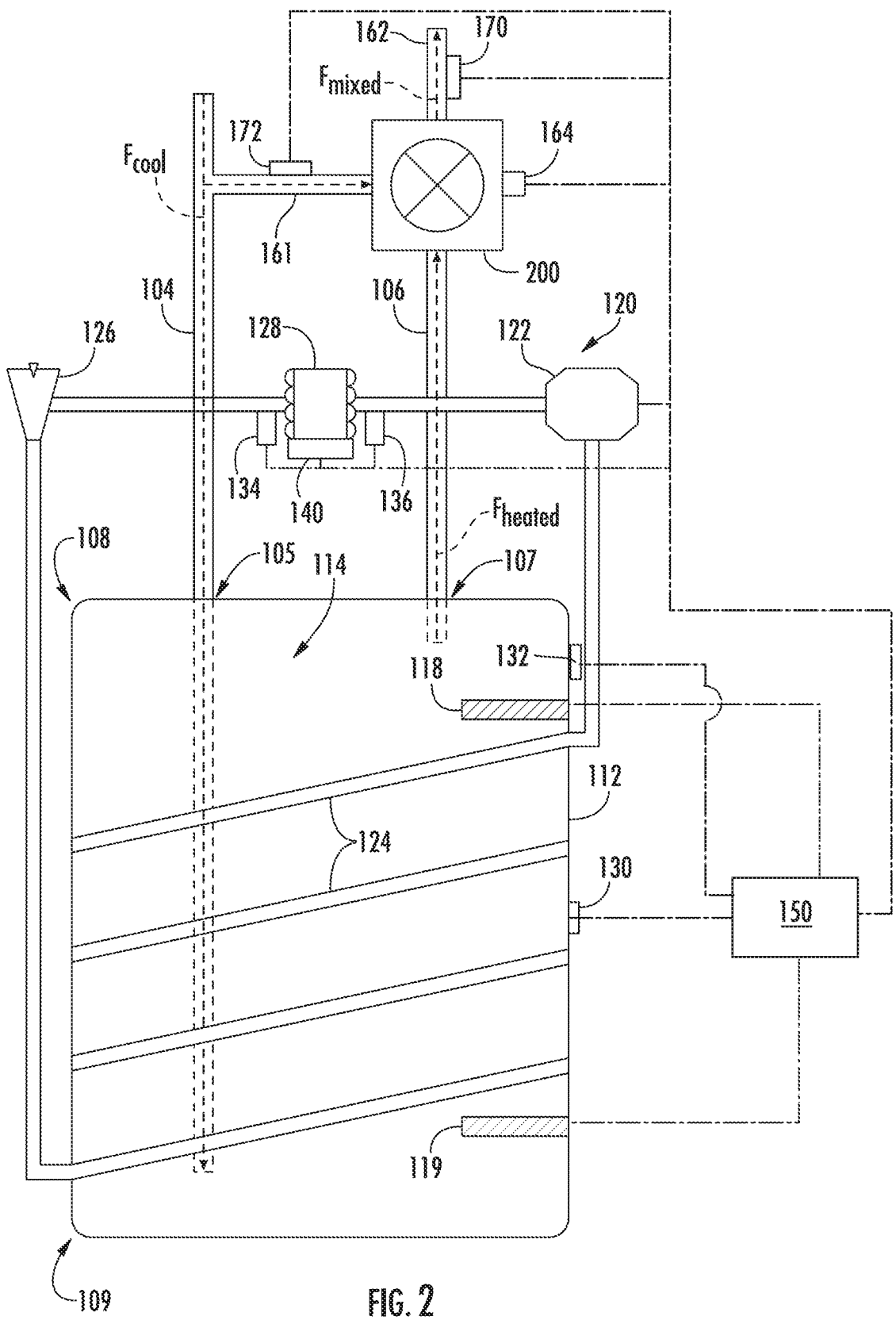
FIG. 2 provides a schematic view of certain components of the exemplary water heater appliance of FIG. 1.

FIG. 1 provides a perspective view of a water heater appliance 100 according to exemplary embodiments of the present disclosure. FIG. 2 provides a schematic view of certain components of water heater appliance 100. As may be seen in FIGS. 1 and 2, water heater appliance 100 includes a casing 102 and a tank 112 mounted within casing 102. Tank 112 defines an interior volume 114 for heating water therein.

Water heater appliance 100 may include an inlet conduit 104 and an outlet conduit 106 that are both in fluid communication with tank 112 within casing 102. As an example, cold water from a water source (e.g., a municipal water supply or a well) enters water heater appliance 100 through inlet conduit 104. From inlet conduit 104, such cold water enters interior volume 114 of tank 112 wherein the water is heated to generate heated water. Such heated water exits water heater appliance 100 at outlet conduit 106 and, for example, is supplied to a bath, shower, sink, or any other suitable feature.

As may be seen in FIG. 1, water heater appliance 100 extends between a top portion 108 and a bottom portion 109 along a vertical direction V. Thus, water heater appliance 100 is generally vertically oriented. Water heater appliance 100 can be leveled (e.g., such that casing 102 is plumb in the vertical direction V) in order to facilitate proper operation of water heater appliance 100.

A drain pan 110 is positioned at bottom portion 109 of water heater appliance 100 such that water heater appliance 100 sits on drain pan 110. Drain pan 110 sits beneath water heater appliance 100 along the vertical direction V (e.g., to collect water that leaks from water heater appliance 100 or water that condenses on an evaporator 128 of water heater appliance 100). It should be understood that water heater appliance 100 is provided by way of example only and that the present disclosure may be used with any suitable water heater appliance.

Turning now to FIG. 2, water heater appliance 100 may include an upper heating element 118, a lower heating element 119, or a sealed system 120 for heating water within interior volume 114 of tank 112. Thus, water heater appliance 100 may be commonly referred to as a "heat pump water heater appliance." Upper and lower heating elements 118 and 119 can be any suitable heating elements. For example, upper heating element 118 or lower heating element 119 may be an electric resistance element, a microwave element, an induction element, or any other suitable heating element or combination thereof. Additionally or alternatively, lower heating element 119 may be a gas burner.

Sealed system 120 generally includes a compressor 122, a condenser 124, a throttling device 126, and an evaporator 128. Condenser 124 is thermally coupled or assembled in a heat exchange relationship with tank 112 in order to heat water within interior volume 114 of tank 112 during operation of sealed system 120. For instance, condenser 124 may be a conduit coiled around and mounted to tank 112. During operation of sealed system 120, refrigerant exits evaporator 128 as a fluid in the form of a superheated vapor or high quality vapor mixture. Upon exiting evaporator 128, the refrigerant enters compressor 122 wherein the pressure and temperature of the refrigerant are increased such that the refrigerant becomes a superheated vapor. The superheated vapor from compressor 122 enters condenser 124 wherein it transfers energy to the water within tank 112 and condenses into a saturated liquid or high quality liquid vapor mixture. This high quality/saturated liquid vapor mixture exits condenser 124 and travels through throttling device 126 that is configured for regulating a flow rate of refrigerant therethrough. Upon exiting throttling device 126, the pressure and temperature of the refrigerant drop at which time the refrigerant enters evaporator 128 and the cycle repeats itself. In certain exemplary embodiments, throttling device 126 may be an electronic expansion valve (EEV).

A fan or air handler 140 may assist with heat transfer between air about water heater appliance 100 (e.g., within casing 102) and refrigerant within evaporator 128. Air handler 140 may be positioned within casing 102 on or adjacent to evaporator 128. Thus, when activated, air handler 140 may direct a flow of air towards or across evaporator 128, and the flow of air from air handler 140 may assist with heating refrigerant within evaporator 128. Air handler 140 may be any suitable type of air handler, such as an axial or centrifugal fan.

In some embodiments, water heater appliance 100 includes a first (e.g., tank temperature sensor 130 (e.g., lower temperature sensor). First tank temperature sensor 130 may be configured for measuring a temperature of water within interior volume 114 of tank 112 (e.g., within a lower portion of interior volume 114). First tank temperature sensor 130 can be positioned at any suitable location within or on water heater appliance 100. For instance, first tank temperature sensor 130 may be positioned within interior volume 114 of tank 112 or may be mounted to tank 112 outside of interior volume 114 of tank 112. When mounted to tank 112 outside of interior volume 114 of tank 112, first tank temperature sensor 130 can be configured for indirectly measuring the temperature of water within interior volume 114 of tank 112. For example, first tank temperature sensor 130 can measure the temperature of tank 112 and correlate the temperature of tank 112 to the temperature of water within interior volume 114 of tank 112. As shown, first tank temperature sensor 130 may be positioned at a lower portion of tank 112 (e.g., at or below a halfway mark of interior volume 114). First tank temperature sensor 130 can be any suitable temperature sensor. For example, first tank temperature sensor 130 may be a thermocouple or a thermistor.

In certain embodiments, water heater appliance 100 includes a second tank temperature sensor 132 (e.g., upper temperature sensor), an evaporator inlet temperature sensor 134, or an evaporator outlet temperature sensor 136.

Second tank temperature sensor 132 may be configured for measuring a temperature of water within interior volume 114 of tank 112 (e.g., at an upper portion of interior volume 114 or at a different position than first tank temperature sensor 130). Second tank temperature sensor 132 can be positioned at any suitable location within or on water heater appliance 100. For instance, second tank temperature sensor 132 may be positioned within interior volume 114 of tank 112 or may be mounted to tank 112 outside of interior volume 114 of tank 112. When mounted to tank 112 outside of interior volume 114 of tank 112, second tank temperature sensor 132 can be configured for indirectly measuring the temperature of water within interior volume 114 of tank 112. For example, second tank temperature sensor 132 can measure the temperature of tank 112 and correlate the temperature of tank 112 to the temperature of water within interior volume 114 of tank 112. As shown, second tank temperature sensor 132 may be positioned at or adjacent top portion 108 of water heater appliance 100 (e.g., at or adjacent to an inlet of outlet conduit 106). Second tank temperature sensor 132 can be any suitable temperature sensor. For example, second tank temperature sensor 132 may be a thermocouple or a thermistor.

Evaporator inlet temperature sensor 134 may be configured for measuring a temperature of refrigerant at or adjacent to an inlet of evaporator 128. Thus, evaporator inlet temperature sensor 134 may be positioned at or adjacent to an inlet of evaporator 128, as shown in FIG. 2. For example, evaporator inlet temperature sensor 134 may be mounted to tubing that directs refrigerant into evaporator 128 (e.g., at or adjacent to an inlet of evaporator 128). When mounted to tubing, evaporator inlet temperature sensor 134 can be configured for indirectly measuring the temperature of refrigerant at inlet of evaporator 128. For example, evaporator inlet temperature sensor 134 can measure the temperature of the tubing and correlate the temperature of the tubing to the temperature of refrigerant at inlet of evaporator 128. Evaporator inlet temperature sensor 134 can be any suitable temperature sensor. For example, evaporator inlet temperature sensor 134 may be a thermocouple or a thermistor.

Evaporator outlet temperature sensor 136 is configured for measuring a temperature of refrigerant at or adjacent to an outlet of evaporator 128. Thus, evaporator outlet temperature sensor 136 may be positioned at or adjacent to an outlet of evaporator 128, as shown in FIG. 2. For example, evaporator outlet temperature sensor 136 may be mounted to tubing that directs refrigerant out of evaporator 128 (e.g., at or adjacent to an outlet of evaporator 128). When mounted to tubing, evaporator outlet temperature sensor 136 can be configured for indirectly measuring the temperature of refrigerant at outlet of evaporator 128. For example, evaporator outlet temperature sensor 136 can measure the temperature of the tubing and correlate the temperature of the tubing to the temperature of refrigerant at outlet of evaporator 128. Evaporator outlet temperature sensor 136 can be any suitable temperature sensor. For example, evaporator outlet temperature sensor 136 may be a thermocouple or a thermistor.

Water heater appliance 100 includes a controller 150 that may be configured for regulating operation of water heater appliance 100. Moreover, controller 150 may include multiple cycles or modes of operation (e.g., a Sabbath mode and a non-Sabbath mode) that control or regulate various portions of water heater appliance 100 according to one or more discrete criteria. In other words, controller 150 may be configured to control water heater appliance 100 differently for a non-Sabbath mode than in a Sabbath mode.

In certain embodiments, controller 150 is in operative communication (e.g., direct electrical communication, indirect electrical communication, wireless communication, etc.) with upper heating element 118, lower heating element 119, compressor 122, first tank temperature sensor 130, second temperature sensor 132, evaporator inlet temperature sensor 134, evaporator outlet temperature sensor 136, or air handler 140. Thus, controller 150 may selectively activate upper and lower heating elements 118 and 119 or compressor 122 in order to heat water within interior volume 114 of tank 112 (e.g., in response to signals from first tank temperature sensor 130, second temperature sensor 132, evaporator inlet temperature sensor 134, or evaporator outlet temperature sensor 136). Moreover, controller 150 may initiate one or more Sabbath cycles (e.g., method 700 or method 800—FIGS. 6 and 7) to control operation of water heater appliance 100, such as a during a religious holiday or Sabbath.

In some embodiments, controller 150 includes memory (e.g., non-transitive memory) and one or more processing devices (e.g., microprocessors, CPUs or the like), such as general or special purpose microprocessors operable to execute programming instructions or micro-control code associated with operation of water heater appliance 100. The memory can represent random access memory such as DRAM, or read only memory such as ROM or FLASH. The processor executes programming instructions stored in the memory. The memory can be a separate component from the processor or can be included onboard within the processor. Alternatively, controller 150 may be constructed without using a microprocessor (e.g., using a combination of discrete analog or digital logic circuitry; such as switches, amplifiers, integrators, comparators, flip-flops, AND gates, and the like) to perform control functionality instead of relying upon software.

As noted above, controller 150 may include multiple unique cycles or modes of operation, such as a Sabbath mode (e.g., in which a Sabbath cycle is executed) and a non-Sabbath mode (e.g., in which one or more typical water heater cycles are executed). Moreover, controller 150 may automatically (e.g., without active user input or engagement) determine when to enter or exit each mode of operation. Moreover, controller 150 may automatically anticipate and prepare the water heater appliance 100 for a Sabbath (e.g., prior to the start of a Sabbath or Sabbath condition). Controller 150 may further adjust operation of the water heater appliance 100 upon the start of the anticipated Sabbath condition.

In some embodiments, controller 150 is configured to determine when a Sabbath condition occurs (e.g., when work-prohibiting Sabbath traditions must be followed). For instance, such determinations may be made onboard with the rest of the components of controller 150 or, alternatively, offboard, such as on a secondary controller board spaced apart from the rest of controller 150 (and in operative communication therewith). In certain embodiments, controller 150 is programmed to include a preset Jewish calendar. During installation, a user may specify the initial time. A clock module (not shown) may be provided within controller 150 to maintain a current date and time once the initial time is specified. During installation, a user may further specify a geographic location (e.g., zip code, city and state, latitude and longitude, etc.) of water heater appliance 100. Additionally or alternatively, the geographic location may be automatically determined [e.g., by a global positioning satellite unit (not pictured) within controller 150]. Once installed, controller 150 may automatically track and determine when a Sabbath condition occurs along the Jewish calendar at the specified geographic location. For instance, controller 150 may compare the current time to the preset Jewish calendar (e.g., continuously or at a predetermined interval). In some such embodiments, controller 150 may include a communications module to receive information (e.g., from a remote server or website) regarding sunrise and sunset for the specified geographic location. Accordingly, controller 150 may transmit or receive a Sabbath condition signal to indicate exactly when the Sabbath begins or ends.

During activation of water heater appliance 100, controller 150 may generally operate upper heating element 118, lower heating element 119 or compressor 122 in order to heat water within interior volume 114 of tank 112.

As an example (e.g., of a non-Sabbath mode of operation), a user may select or establish a set temperature, $t_s$, for water within interior volume 114 of tank 112, or the set temperature $t_s$ for water within interior volume 114 of tank 112 may be a default value. Based upon the set temperature $t_s$ for water within interior volume 114 of tank 112, controller 150 may selectively activate upper heating element 118, lower heating element 119, or compressor 122 in order to heat water within interior volume 114 of tank 112 to the set temperature $t_s$ for water within interior volume 114 of tank 112. Additionally or alternatively, the set temperature $t_s$ for water within interior volume 114 of tank 112 may be a default value. Based upon the set temperature $t_s$ for water within interior volume 114 of tank 112, controller 150 may selectively activate upper heating element 118, lower heating element 119, or compressor 122. For instance, a temperature range may be provided for the set temperature $t_s$. In other words, a range may be provided that includes a set temperature minimum $t_{smin}$ and a set temperature maximum $t_s$. If that is below and above, respectively, the set temperature $t_s$. If the water within interior volume 114 of tank 112 falls below the set temperature minimum $t_{smin}$, upper heating element 118, lower heating element 119, or compressor 122 may be activated to heat the water. If the water within interior volume 114 of tank 112 rises above the set temperature maximum $t_{smax}$, upper heating element 118, lower heating element 119, or compressor 122 may be deactivated to stop heating the water.

The set temperature $t_s$ for water within interior volume 114 of tank 112 (e.g., in a non-Sabbath mode of operation) may be any suitable temperature. For example, the set temperature $t_s$ for water within interior volume 114 of tank 112 may be a value between 90 and 150 degrees Fahrenheit (F) (32 to 65 degrees Celsius (C)). To prevent scalding and to save energy, consumers may set the thermostat to heat the water within the interior volume 114 to a temperature in a range between 120 degrees F. to 140 degrees F. (about 49 degrees C. to 60 degrees C.).

As may be seen in FIG. 2, in some embodiments, water heater appliance 100 includes a mixing valve 200 (e.g., upstream from a mixed water outlet conduit 162). Generally, mixing valve 200 is in fluid communication with inlet conduit 104 via a bypass conduit 161, outlet conduit 106, and mixed water outlet conduit 162. As discussed in greater detail below, mixing valve 200 is configured for selectively directing water from inlet conduit 104 and outlet conduit 106 into mixed water outlet conduit 162 in order to regulate a temperature of water within mixed water outlet conduit 162. Mixing valve 200 may be positioned or disposed within casing 102 of water heater appliance 100 (e.g., such that mixing valve 200 is integrated within water heater appliance 100).

As an example, mixing valve 200 can selectively adjust between a first position and a second position (e.g., including a plurality of positions first and second positions). In the first position, mixing valve 200 can permit a first flow rate of relatively cool water from inlet conduit 104 (shown schematically with arrow labeled $F_{cool}$ in FIG. 2) into mixed water outlet conduit 162 and mixing valve 200 can also permit a first flow rate of relatively hot water from outlet conduit 106 (shown schematically with arrow labeled $F_{heated}$ in FIG. 2) into mixed water outlet conduit 162. In such a manner, water within mixed water outlet conduit 162 (shown schematically with arrow labeled $F_{mixed}$ in FIG. 2) can have a first relative temperature when mixing valve 200 is in the first position. Similarly, mixing valve 200 can permit a second flow rate of relatively cool water from inlet conduit 104 into mixed water outlet conduit 162 and mixing valve 200 can also permit a second flow rate of relatively hot water from outlet conduit 106 into mixed water outlet conduit 162 in the second position. The first and second flow rates of the relatively cool water and relatively hot water are different such that water within mixed water outlet conduit 162 can have a second relative temperature when mixing valve 200 is in the second position. In such a manner, mixing valve 200 can regulate the temperature of water within mixed water outlet conduit 162 and adjust the temperature of water within mixed water outlet conduit 162 between the first and second relative temperatures.

It should be understood that, in certain exemplary embodiments, mixing valve 200 is adjustable between more positions than the first and second positions. In particular, mixing valve 200 may be adjustable between any suitable number of positions in exemplary embodiments. As an example, mixing valve 200 may be infinitely adjustable in order to permit infinite fine-tuning of the temperature of water within mixed water outlet conduit 162. As an additional or alternative example, mixing valve may be adjustable between a plurality of discrete positions in order to permit a predetermined set of adjustments to the temperature of water within mixed water outlet conduit 162.

Water heater appliance 100 may include a position sensor 164. Position sensor 164 may be configured for determining a position of mixing valve 200. Position sensor 164 can monitor the position of mixing valve 200 in order to assist with regulating the temperature of water within mixed water outlet conduit 162. For example, position sensor 164 can determine when mixing valve 200 is in the first position or the second position (or another position) in order to ensure that mixing valve 200 is properly or suitably positioned depending upon the temperature of water within mixed water outlet conduit 162 desired or selected. Thus, position sensor 164 can provide feedback regarding the status or position of mixing valve 200.

Position sensor 164 may be any suitable type of sensor. For example, position sensor 164 may be a physical sensor, such as an optical sensor, Hall-effect sensor, etc. In alternative exemplary embodiments, controller 150 may determine or measure a motor position of mixing valve 200 based on a previously commanded position of mixing valve 200. Thus, controller 150 may determine that the current position of mixing valve 200 corresponds to a latest position that controller 150 commanded for mixing valve 200 in a previous iteration.

In some embodiments, water heater appliance 100 includes a mixed water conduit temperature sensor 170 or an inlet conduit temperature sensor 172. Mixed water conduit temperature sensor 170 may be positioned downstream of mixing valve 200. For instance, mixed water conduit temperature sensor 170 may be positioned on or proximate mixed water outlet conduit 162 and configured for measuring a temperature of water within mixed water outlet conduit 162. Inlet conduit temperature sensor 172 may be positioned upstream of mixing valve 200. For instance, inlet conduit temperature sensor 172 is positioned on or proximate to inlet conduit 104 or bypass conduit 161 and may be configured for measuring a temperature of water within inlet conduit 104 or bypass conduit 161. In exemplary embodiments, mixed water conduit temperature sensor 170 or inlet conduit temperature sensor 172 is positioned proximate or adjacent to mixing valve 200. Temperature sensors 170, 172 may be any suitable type of temperature sensors, such as a thermistor or thermocouple.

In some embodiments, controller 150 can operate mixing valve 200 to regulate the temperature of water within mixed water outlet conduit 162 (e.g., according to a non-Sabbath mode or a Sabbath mode). For instance, controller 150 can adjust the position of mixing valve 200 in order to regulate the temperature of water within mixed water outlet conduit 162.

As an example, a user can select or establish a set-point temperature of mixing valve 200, or the set-point temperature of mixing valve 200 may be a programmed value. Under certain conditions or instances (e.g., of a non-Sabbath mode of operation), controller 150 can adjust the position of mixing valve 200 in order to change or tweak a ratio of relatively cool water flowing into mixed water outlet conduit 162 from inlet conduit 104 and relatively hot water flowing into mixed water outlet conduit 162 from outlet conduit 106. Optionally, adjustments to the position of the mixing valve 200 may be based upon the temperature measurements made, for instance, at one or more of the temperature sensors 170, 172. For instance, a feedback loop or PID control scheme may be programmed within controller 150 to adjust the position of mixing valve 200 such that the temperature of water within mixed water outlet conduit 162 matches the set-point temperature. In such a manner, controller 150 can regulate the temperature of water within mixed water outlet conduit 162.

The set-point temperature of mixing valve 200 (e.g., in a non-Sabbath mode of operation) can be any suitable temperature. For example, the set temperature $t_s$ for water within interior volume 114 of tank 112 may be a value between 90 and 120 degrees F. to 140 degrees F. (about 49 degrees C. to 60 degrees C.). In particular, the set-point temperature of mixing valve 200 may be selected such that the set-point temperature of mixing valve 200 is less than the set temperature for water within interior volume 114 of tank 112. In such a manner, mixing valve 200 can use water from inlet conduit 104 and outlet conduit 106 to regulate the temperature of water within mixed water outlet conduit 162.

Figure 3:
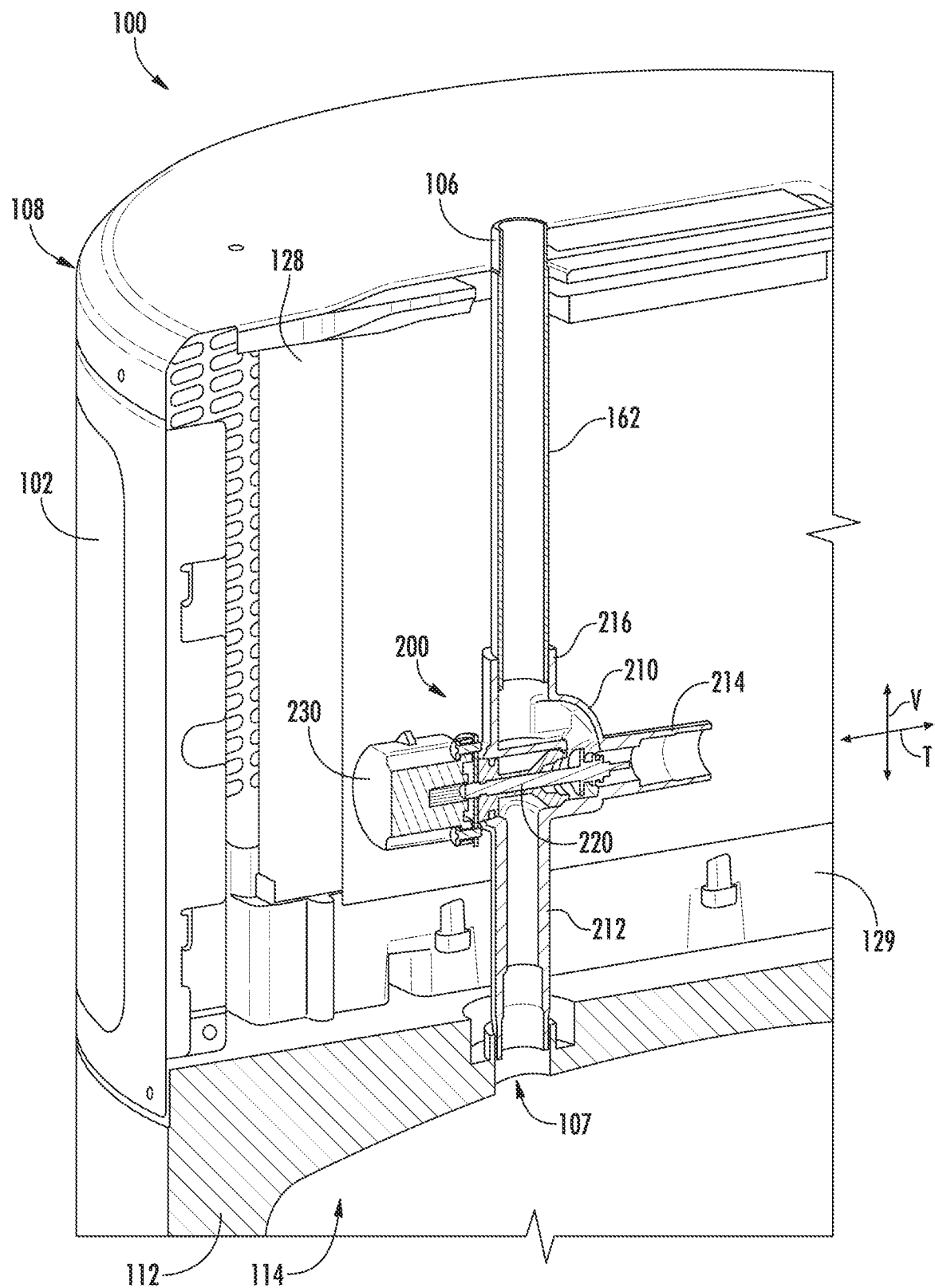
FIG. 3 provides a partial, section view of the exemplary water heater appliance of FIG. 1.
Figure 4:
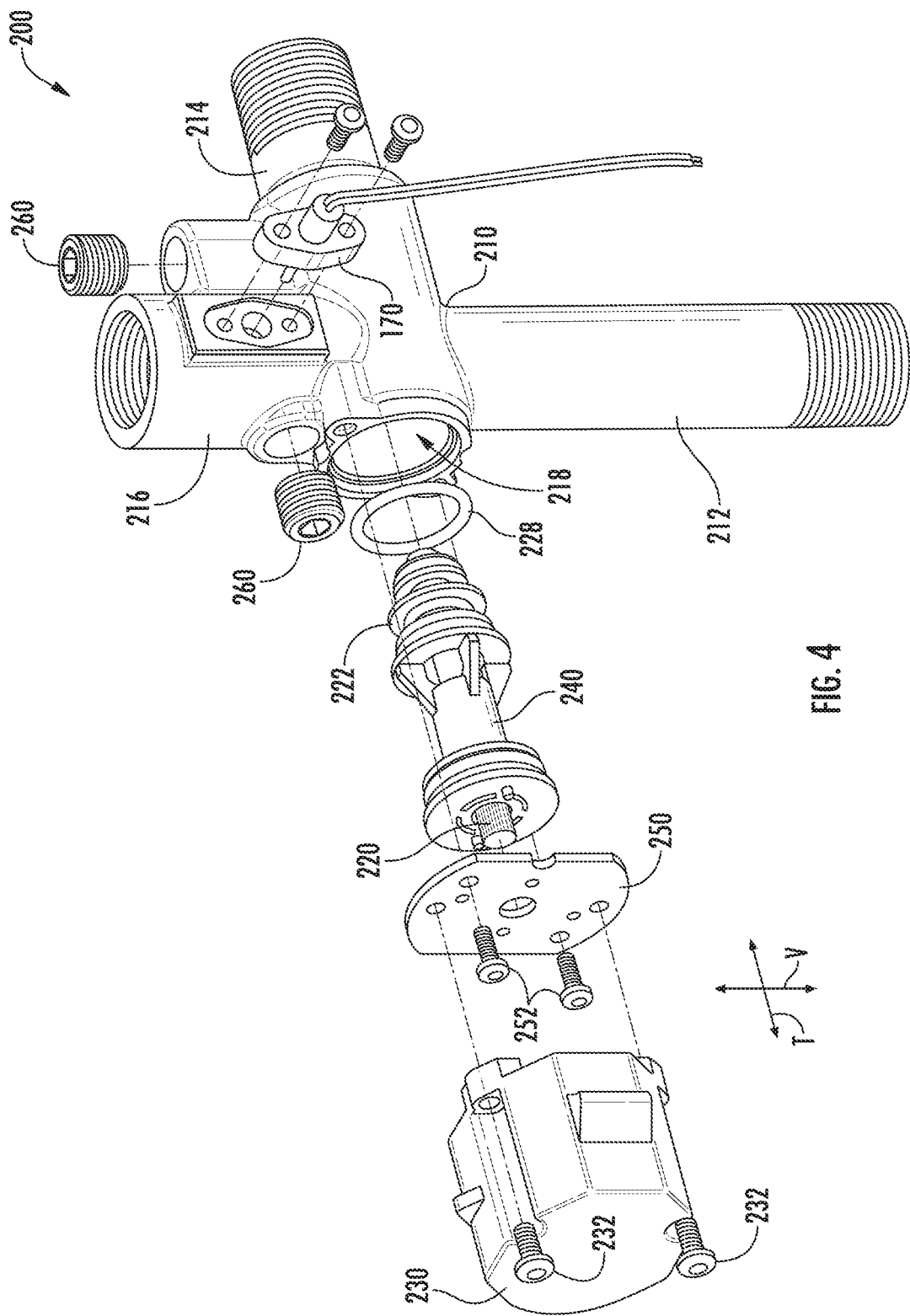
FIG. 4 provides an exploded view of a mixing valve of the exemplary water heater appliance of FIG. 1.

FIG. 3 provides a partial, section view of water heater appliance 100 at top portion 108 of water heater appliance 100. FIG. 4 provides an exploded view of mixing valve 200 of water heater appliance 100. It should be understood that, while described in greater detail below, any suitable mixing valve may be used in accordance with the present disclosure.

As may be seen in FIGS. 3 and 4, mixing valve 200 generally includes a valve body 210. Valve body 210 has a heated water conduit 212, a cold water conduit 214, a mixed water conduit 216 and a mixing chamber 218. As may be seen in FIG. 3, heated water conduit 212 of valve body 210 is coupled to tank 112 at an outlet 107 of tank 112. As an example, heated water conduit 212 of valve body 210 may be threaded to tank 112 at outlet 107 of tank 112 such that heated water conduit 212 of valve body 210 forms at least a portion of outlet conduit 106. Bypass conduit 161 is coupled to cold water conduit 214 of valve body 210. Accordingly, heated water from interior volume 114 of tank 112 may flow into mixing chamber 218 of valve body 210 via heated water conduit 212 of valve body 210, and cold water from inlet conduit 104 may flow into mixing chamber 218 of valve body 210 via cold water conduit 214 of valve body 210.

Heated water conduit 212 of valve body 210 may be positioned (e.g., directly) below mixed water conduit 216 of valve body 210 within casing 102 of water heater appliance 100. For example, heated water conduit 212 and mixed water conduit 216 of valve body 210 may be positioned coaxially with each other, and heated water conduit 212 and mixed water conduit 216 of valve body 210 may both extend vertically within casing 102 of water heater appliance 100. In addition, cold water conduit 214 of valve body 210 may be oriented such that cold water conduit 214 extends orthogonal to heated water conduit 212 and mixed water conduit 216 of valve body 210. Such arrangement of heated water conduit 212, cold water conduit 214 and mixed water conduit 216 of valve body 210 may assist with preserving valuable volume within casing 102 of water heater appliance 100.

Optionally, valve body 210 may be formed such that heated water conduit 212, cold water conduit 214 and mixed water conduit 216 of valve body 210 are integrally formed with one another. Thus, for example, valve body 210 may be cast from a suitable metal, such as steel, aluminum, bronze, etc. Valve body 210 may also be formed of any other suitable rigid or ductile material, such as a plastic, a composite, etc., that is suitable for shipping and installing water heater appliance 100 without fracturing valve body 210.

Figure 5:
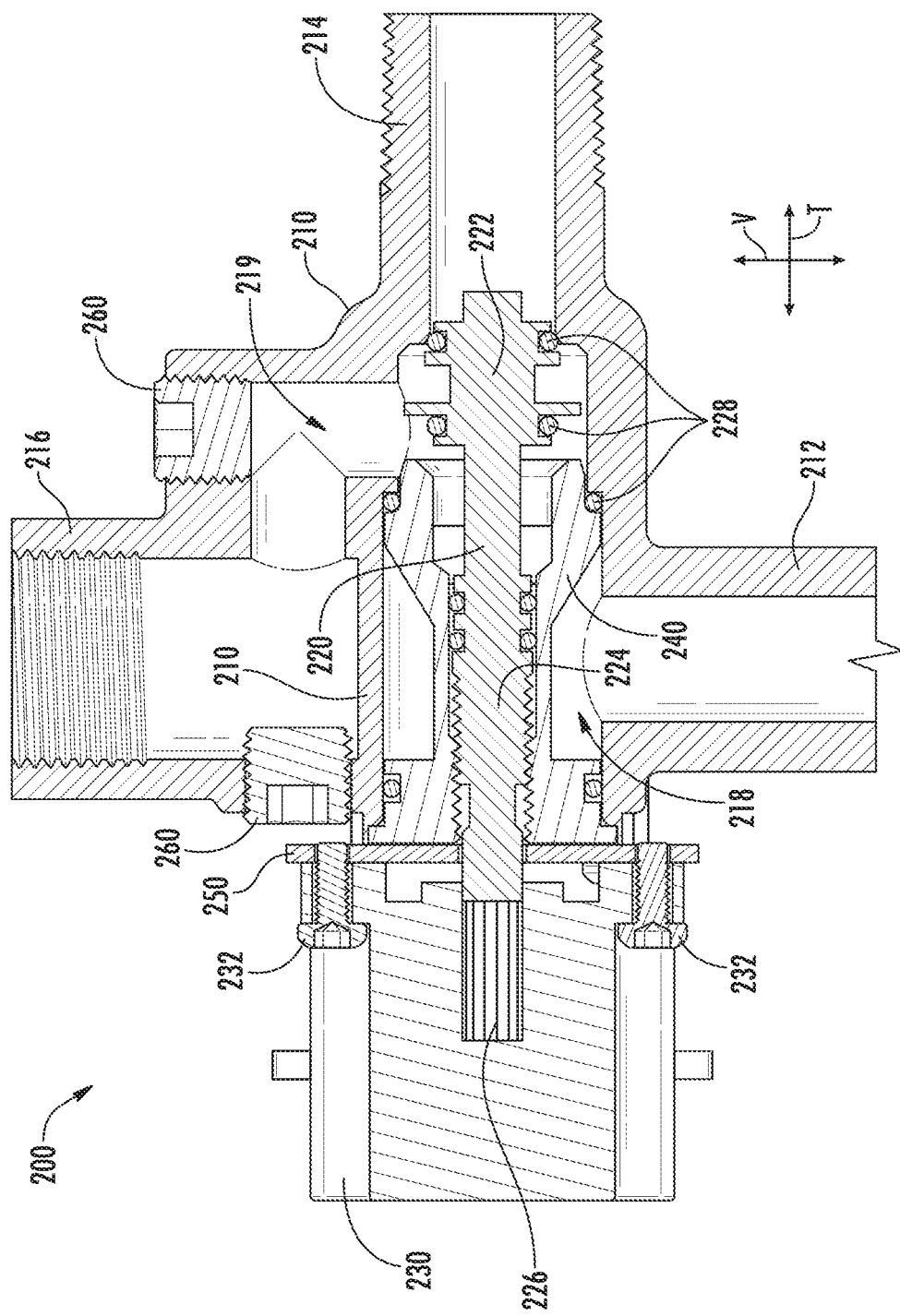
FIG. 5 provides a partial, section view of the mixing valve of FIG. 4 with the plunger of the mixing valve in a fully closed position.

As may be seen in FIG. 5, valve body 210 may define a supply conduit 219 that extends between mixing chamber 218 and mixed water conduit 216 of valve body 210. Thus, supply conduit 219 of valve body 210 directs water from mixing chamber 218 to mixed water conduit 216 of valve body 210. Supply conduit 219 of valve body 210 may formed such that supply conduit 219 turns or redirects water within valve body 210 (e.g., by about ninety degrees between mixing chamber 218 and mixed water conduit 216 of valve body 210). As used herein with regards to angle approximations, the term "about" means within ten degrees of the stated angle. Supply conduit 219 of valve body 210 may also be integrally formed with mixed water conduit 216 of valve body 210.

In some embodiments, mixing valve 200 includes a plunger 220 and a support bracket 240. Plunger 220 is positioned within valve body 210 at mixing chamber 218 of valve body 210. Plunger 220 has a head 222, which may assist with regulating water flow into mixing chamber 218 of valve body 210. Support bracket 240 may be positioned within valve body 210 at mixing chamber 218 of valve body 210. When assembled, support bracket 240 may engage plunger 220 within valve body 210 (e.g., in order to support plunger 220 within valve body 210). For example, a post 224 of plunger 220 may be threaded to support bracket 240 (e.g., within mixing chamber 218 of valve body 210).

Turning to FIG. 4, mixing valve 200 may include a mounting plate 250 (e.g., coupled to valve body 210). Any suitable method or mechanism may be used to couple mounting plate 250 to valve body 210. For example, plate fasteners 252 may extend through mounting plate 250 into valve body 210 in order to couple mounting plate 250 to valve body 210. Mounting plate 250 contacts support bracket 240 such that mounting plate 250 retains or holds support bracket 240 within mixing chamber 218 of valve body 210.

Mixing valve 200 further includes a motor 230, such as a stepper motor. Thus, mixing valve 200 is generally referred to as an "electronic mixing valve." Motor 230 is coupled to plunger 220, and motor 230 is operable to adjust a position of the head 222 of plunger 220 within valve body 210 (e.g., as directed by controller 150). For example, motor 230 may engage splines 226 formed on an end of plunger 220 opposite the head 222 of plunger 220, and motor 230 may rotate plunger 220 relative to support bracket 240 such that the threaded connection between post 224 of plunger 220 and support bracket 240 moves the head 222 of plunger 220 within mixing chamber 218 of valve body 210.

As may be seen in FIGS. 3 and 4, mixed water conduit 216 of valve body 210 may be oriented such that liquid within mixed water conduit 216 flows along the vertical direction V. Conversely, motor 230 may be configured for moving plunger 220 along a transverse direction T that is, for example, substantially, perpendicular to the vertical direction V. As used herein the phrase "substantially perpendicular" means within ten degrees of perpendicular.

Motor 230 may be positioned on mounting plate 250 (e.g., on a side of valve body 210 positioned opposite cold water conduit 214 of valve body 210). Any suitable method or mechanism may be used to couple motor 230 to mounting plate 250. For example, motor fasteners 232 may extend through motor 230 into mounting plate 250 in order to couple motor 230 to mounting plate 250. Such arrangement of motor 230 on valve body 210 may assist with accessing motor 230 within casing 102 of water heater appliance 100. For example, a service technician or owner of water heater appliance 100 may remove motor 230 from valve body 210 (e.g., by removing motor fasteners 232) without having to remove valve body 210 from casing 102 of water heater appliance 100 or having to remove mounting plate 250 from valve body 210 and thereby unsealing valve body 210.

As may be seen in FIG. 3, mixing valve 200 may be positioned within casing 102 at or adjacent top portion 108 of water heater appliance 100. In particular, mixing valve 200 may be positioned within casing 102 above tank 112 and, for example, in a vertical plane between evaporator 128 and compressor 122 of sealed system 120. As discussed in greater detail below, mixing valve 200 may be arranged such that mixing valve 200 does not significantly hinder or obstruct operation of sealed system 120. For example, heated water conduit 212 of valve body 210 may be dimensioned such that valve body 210 is positioned at a bottom portion of evaporator 128 and out of the airflow path into evaporator 128 and such that cold water conduit 214 does not impact a drain pan 129 of evaporator 128 below evaporator 128. Additionally or alternatively, cold water conduit 214 may also be oriented such that cold water conduit 214 extends towards inlet conduit 104 within casing 102.

Figure 8:
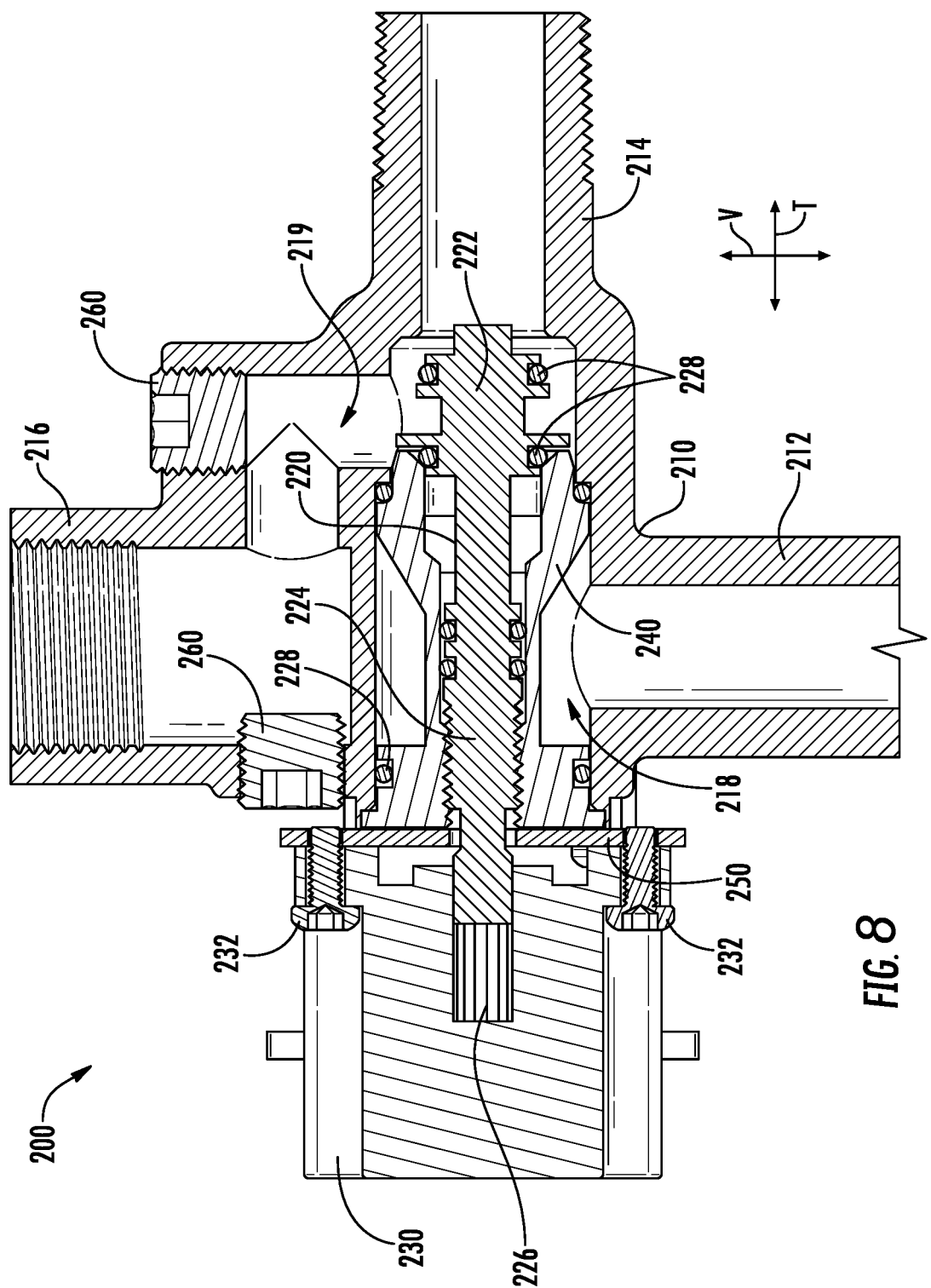
FIG. 8 provides a partial, section view of the mixing valve of FIG. 4 with the plunger of the mixing valve in a fully open position.

FIG. 8 provides a partial, section view of mixing valve 200 with plunger 220 in a fully open position. FIG. 5 provides a partial, section view of mixing valve 200 with plunger 220 in a fully closed position. As may be seen in FIG. 8, head 222 of plunger 220 is positioned, for example, within mixing chamber 218 of valve body 210, such that head 222 of plunger 220 blocks or significantly limits fluid flow from hot water conduit 212 of valve body 210 into mixing chamber 218 of valve body 210 when plunger 220 is in the fully open position. Thus, all or most of water exiting mixing chamber 218 and flowing to mixed water conduit 216 of valve body 210 is from cold water conduit 214, and water within mixed water conduit 216 of valve body 210 is at or about the temperature of water within cold water conduit 214 when plunger 220 is in the fully open position. Conversely, as may be seen in FIG. 5, head 222 of plunger 220 is positioned (e.g., within mixing chamber 218 of valve body 210) such that head 222 of plunger 220 blocks or significantly limits fluid flow from cold water conduit 214 of valve body 210 into mixing chamber 218 of valve body 210 when plunger 220 is in the fully closed position. Thus, all or most of water exiting mixing chamber 218 and flowing to mixed water conduit 216 of valve body 210 is from hot water conduit 212 and water within mixed water conduit 216 of valve body 210 is at or about the temperature of water within hot water conduit 212 when plunger 220 is in the fully closed position.

During use, motor 230 may adjust plunger 220 between the open and closed positions. In addition, motor 230 may adjust plunger 220 to any suitable position between the open and closed positions. In such a manner, motor 230 may adjust the temperature of water exiting mixing valve 200 at mixed water conduit 216 of valve body 210 to any suitable temperature (e.g., as the set-point temperature of mixing valve 200) between the temperature of water within cold water conduit 214 and the temperature of water within hot water conduit 212.

As may be seen in FIG. 5, mixing valve 200 may include various seals 228. Certain seals of seals 228 extend between support bracket 240 and valve body 210 in order to limit leakage of water from mixing chamber 218 of valve body 210. In addition, other seals of seals 228 extend between plunger 220 and valve body 210 in order to assist with limiting leakage of water around the head 222 of plunger 220 (e.g., when plunger 220 is in the open and closed positions). Mixing valve 200 further includes plugs 260 mounted to valve body 210 (e.g., that seal openings used to form or machine supply conduit 219 within valve body 210). Mixing conduit temperature sensor 170 may also be mounted to valve body 210 (e.g., at mixed water conduit 216, as shown in FIG. 4).

Figure 6:
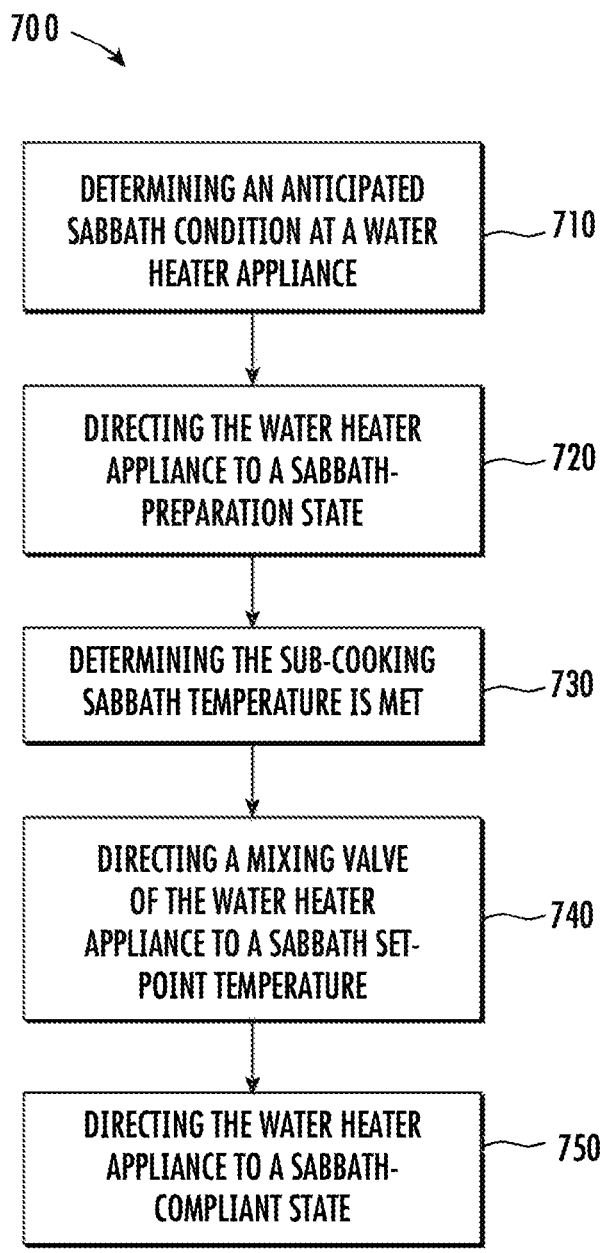
FIG. 6 provides a flow chart illustrating a method of operating a water heater appliance according to exemplary embodiments of the present disclosure.
Figure 7:
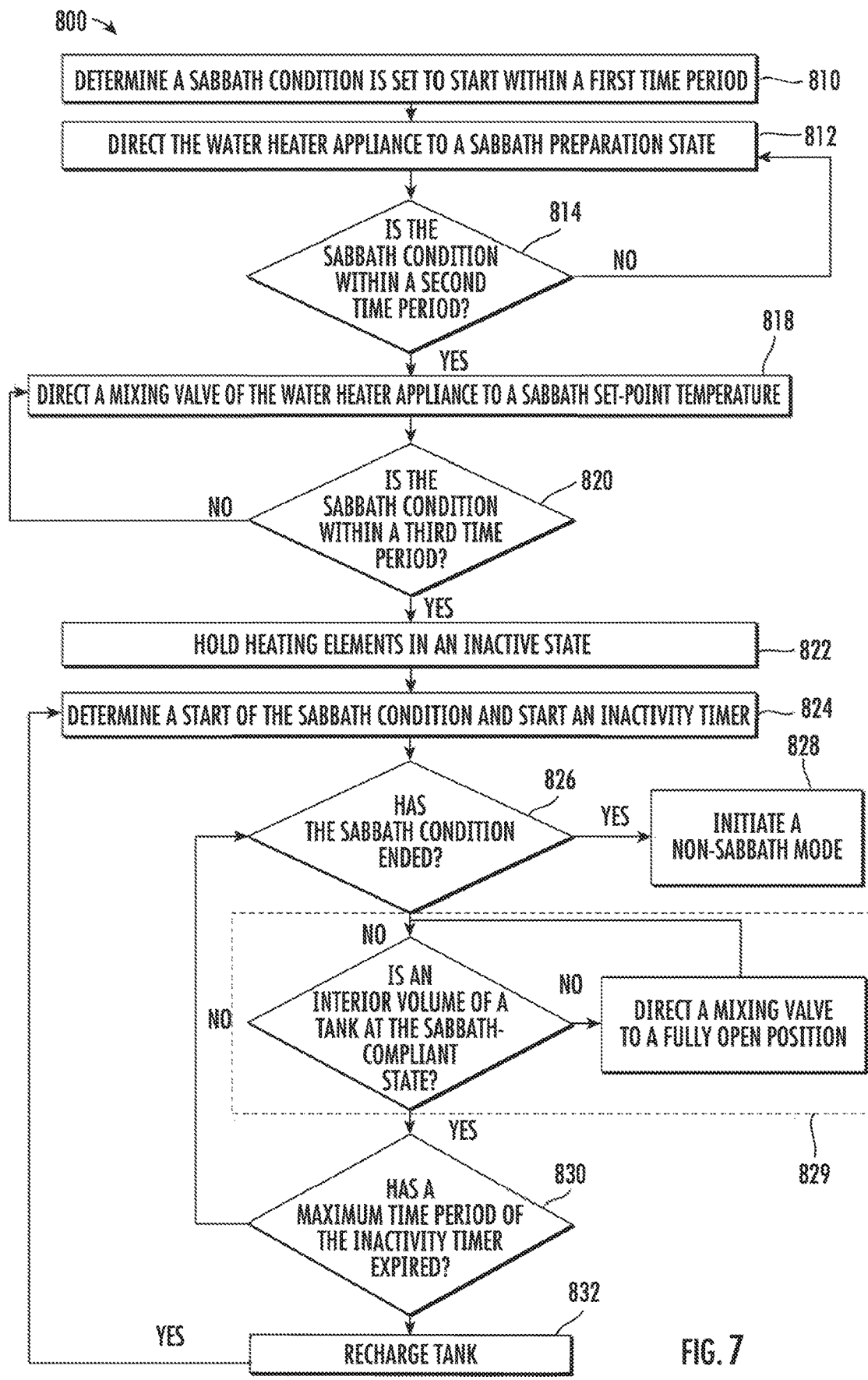
FIG. 7 provides a flow chart illustrating another method of operating a water heater appliance according to exemplary embodiments of the present disclosure.

Turning now to FIGS. 6 and 7, flow diagrams are provided of methods 700 and 800 according to exemplary embodiments of the present disclosure. Generally, the methods 700 and 800 provide for controlling and operating a water heater appliance, such as water heater appliance 100 (FIG. 2) (e.g., according to a Sabbath cycle). For instance, methods 700 and 800 may provide for directing operations at one or more of upper heating element 118, lower heating element 119, compressor 122, first tank temperature sensor 130, second temperature sensor 132, mixing valve 200 (FIG. 2), as well as any other features of a suitable water appliance. The methods 700, 800 may be performed, for instance, by the controller 150. As described above, the controller 150 may be in operative communication with upper heating element 118, lower heating element 119, compressor 122, first or lower tank temperature sensor 130, second or upper temperature sensor 132, or mixing valve 200. Controller 150 may send signals to and receive signals from one or more of upper heating element 118, lower heating element 119, compressor 122, first tank temperature sensor 130, second temperature sensor 132, or mixing valve 200. Controller 150 may further be in communication with other suitable components of the appliance 100 to facilitate operation of the water heater appliance 100 generally.

FIGS. 6 and 7 depict steps performed in a particular order for purpose of illustration and discussion. Those of ordinary skill in the art, using the disclosures provided herein, will understand that the steps of any of the methods disclosed herein can be modified, adapted, rearranged, omitted, or expanded in various ways without deviating from the scope of the present disclosure. For instance, it is understood that method 800 may be used in the context of method 700, or vice versa.

Advantageously, the present methods may provide for effective or efficient performance of a water heater appliance while ensuring adherence to Jewish law.

Turning especially to FIG. 6, at 710, the method 700 includes determining an anticipated Sabbath condition (e.g., an upcoming Sabbath according to Jewish law) at a water heater appliance. Specifically, 710 includes determining that a Sabbath (i.e., designated religious holiday or period of religiously-required rest) will soon begin. Optionally, 710 may be performed prior to the actual start of the anticipated Sabbath condition. For instance, 710 may be performed at a predetermined amount of time (e.g., greater than or equal to 24 hours) prior to the start of the anticipated Sabbath. Thus, 710 may include determining the anticipated Sabbath will start within the predetermined time (e.g., in a day's time). In other words, 710 may include determining the predetermined time until the start of the Sabbath condition. In such embodiments, the water heater appliance may begin preparing for the Sabbath condition before the Sabbath actually starts (e.g., starting at the predetermined time, such as at least 24 hours in advance).

At 720, the method 700 includes directing the water heater appliance to a Sabbath-preparation state based on the anticipated Sabbath condition (e.g., in response to 710).

In some embodiments, 720 includes directing a (e.g., lower) portion of the tank of the water heater appliance to a sub-cooking Sabbath temperature (e.g., a reduced predetermined temperature below 45 degrees Celsius) based on the anticipated Sabbath condition. For instance, the sub-cooking temperature may be assigned for the lower tank temperature sensor. In turn, one of more heating elements (e.g., the lower heating element) may be selectively activated on a feedback loop to maintain the lower portion of the water tank at the sub-cooking Sabbath set temperature. Optionally, the sub-cooking Sabbath temperature may be a temperature between 38 degrees Celsius and 45 degrees Celsius, such as 43 degrees Celsius.

In additional or alternative embodiments, 720 includes directing another (e.g., upper) portion of a tank of the water heater appliance to a stratified Sabbath temperature above the sub-cooking Sabbath temperature based on the anticipated Sabbath condition. For instance, the stratified Sabbath temperature may be assigned for the upper tank temperature sensor. In turn, one of more heating elements (e.g., the upper heating element) may be selectively activated on a feedback loop to maintain the upper portion of the water tank at the stratified Sabbath temperature. Optionally, the stratified Sabbath temperature may be less than or equal to 75 degrees Celsius. As an example, the stratified Sabbath temperature may be a temperature between 45 degrees Celsius and 75 degrees Celsius. As another example, the stratified Sabbath temperature may be a temperature between 65 degrees Celsius and 73 degrees Celsius, such as 71 degrees Celsius.

If the Sabbath condition starts prior to the sub-cooking Sabbath temperature being met (e.g., at the lower portion of the tank), the method 700 may include directing the mixing valve to a fully open position. Thus, all or most of water exiting the mixing valve and flowing to the mixed water conduit may be relatively cold water (e.g., as described above). The fully open position may be maintained for the duration of the Sabbath mode or until the sub-cooking Sabbath temperature is met (e.g., such that the lower tank temperature sensor detects a temperature at or below the sub-cooking Sabbath temperature).

At 730, the method 700 include determining the sub-cooking Sabbath temperature is met (e.g., at the lower portion of the tank). For instance, the temperature measured at the lower tank temperature sensor may be less than or equal to the sub-cooking Sabbath temperature. Generally, 730 occurs after 720. Ideally, 730 occurs prior to the start of the anticipated Sabbath condition. Nonetheless, under certain conditions, 730 may occur following the start of the anticipated Sabbath condition.

At 740, the method 700 includes directing a mixing valve of the water heater appliance to a Sabbath set-point temperature. In particular, the mixing valve may be directed (e.g., according to a feedback loop or a predetermined static position between fully open and fully closed) to maintain the temperature within the mixing conduit at the Sabbath set-point temperature. The Sabbath set-point temperature may be distinct from, for instance, a set-point of the mixing valve in a non-Sabbath mode. Generally, the Sabbath set-point may be below 45 degrees Celsius. For instance, the Sabbath set-point may be a temperature between 38 degrees Celsius and 45 degrees Celsius, such as 43 degrees Celsius.

In optional embodiments, 740 will not occur until at a least a predetermined conditional time (e.g., as measured in hours, such as 12 hours) is met prior to the start of the Sabbath condition. Thus, directing the mixing valve to the Sabbath set-point may be conditioned on determining the predetermined conditional time. In other words, the method 700 may require determining the predetermined conditional time until the start of the anticipated Sabbath condition. Thus, the mixing valve will not be directed to the Sabbath set-point unless the anticipated Sabbath condition will start (or has started and not expired) within at least the predetermined conditional time (e.g., 12 hours).

At 750, the method 700 includes directing the water heater appliance to a Sabbath-compliant state (e.g., until the anticipated Sabbath condition expires). For instance, the lower heating element or the upper heating element may be deactivated or otherwise held in an inactive state (e.g., simultaneously). Optionally, one or more of the heating elements may be held in the inactive state starting at least one hour prior to the start of the anticipated Sabbath condition.

Following the start of the anticipated Sabbath condition, the controller may track or record the elapsed time for the Sabbath condition to detect if/when a maximum inactive period expires (e.g., as measured in hours, such as 24 hours). For instance, the controller may detect may if the Sabbath condition continues past than the maximum inactive period. This may be the case if, for instance, a religious holiday follows immediately after a weekly Sabbath condition. In response to the maximum time period expiring, one or more of the heating elements may be reactivated to recharge the tank. Specifically, the lower portion of the tank may be redirected to the sub-cooking Sabbath temperature (e.g., in response to determining expiration of the maximum inactive period). Thus, the water heater compliance may continue to provide hot water while maintaining compliance with religious requirements.

After the tank is recharged, the maximum inactive period may be restarted (e.g., to repeat the recharging of the tank following another expiration of the maximum inactive period).

Upon expiration of the Sabbath or Sabbath condition (e.g., at a determined Sabbath end time), the method 700 may initiate a non-Sabbath mode. The Sabbath mode may thus be discontinued as the non-Sabbath mode is initiated (e.g., for a typical, non-Sabbath cycle).

Turning now to FIG. 7, at 810, the method 800 includes determining a Sabbath condition is set to start within a first time period. In other words, 810 includes anticipating the Sabbath condition will start within the first time period or predetermined period of time (e.g., as measured in hours, such as a time greater than or equal to 24 hours). As noted above the Sabbath is a designated religious holiday or period of religiously-required rest. The determination that the Sabbath is set to start may include considerations of geography (e.g., provided by a user or detected by a GPS module), time, sunset/sunrise, etc. according to a programmed Jewish calendar.

At 812, the method 800 includes directing the water heater appliance to a Sabbath preparation state (e.g., in response to 812).

In some embodiments, 812 includes directing a (e.g., lower) portion of a tank of the water heater appliance to a sub-cooking Sabbath temperature (e.g., a reduced predetermined temperature below 45 degrees Celsius) based on the anticipated Sabbath condition. For instance, the sub-cooking temperature may be assigned for the lower tank temperature sensor. In turn, one of more heating elements (e.g., the lower heating element) may be selectively activated on a feedback loop to maintain the lower portion of the water tank at the sub-cooking Sabbath set temperature. Optionally, the sub-cooking Sabbath temperature may be a temperature between 38 degrees Celsius and 45 degrees Celsius, such as 43 degrees Celsius.

In additional or alternative embodiments, 812 includes directing an upper portion of a tank of the water heater appliance to a stratified Sabbath temperature above the sub-cooking Sabbath temperature based on the anticipated Sabbath condition. For instance, the stratified Sabbath temperature may be assigned for the upper tank temperature sensor. In turn, one of more heating elements (e.g., the upper heating element) may be selectively activated on a feedback loop to maintain the upper portion of the water tank at the stratified Sabbath temperature. Optionally, the stratified Sabbath temperature may be less than or equal to 75 degrees Celsius. As an example, the stratified Sabbath temperature may be a temperature between 45 degrees Celsius and 75 degrees Celsius. As another example, the stratified Sabbath temperature may be a temperature between 65 degrees Celsius and 73 degrees Celsius, such as 71 degrees Celsius.

In some embodiments, 812 begins in response to 810. Thus, the water heater appliance may start preparing for the Sabbath (i.e., entering the Sabbath preparation state) prior to the Sabbath actually beginning, such as a day in advance.

At 814, the method 800 includes evaluating the time until the start of the Sabbath condition. Specifically, following the start or initiation of 812, 814 may include determining if the Sabbath will (i.e., is anticipated to) begin within a second time period or predetermined conditional time period (e.g., as measured in hours, such as 12 hours) that is less than the first time period. If the Sabbath will not occur within the second time period from 814, the controller may return to 812 before repeating 814. In other words, the method may continue to direct the water heater appliance to the Sabbath-preparation state. If the Sabbath will (i.e., is anticipated to begin) within the second time period, the method 800 may proceed to 818.

At 818, the method 800 includes directing a mixing valve of the water heater appliance to a Sabbath set-point temperature. In particular, the mixing valve may be directed (e.g., according to a feedback loop or a predetermined static position between fully open and fully closed) to maintain the temperature within the mixing conduit at the Sabbath set-point temperature. The Sabbath set-point temperature may be distinct from, for instance, a set-point of the mixing valve in a non-Sabbath mode. Generally, the Sabbath set-point may be below 45 degrees Celsius. For instance, the Sabbath set-point may be a temperature between 38 degrees Celsius and 45 degrees Celsius, such as 43 degrees Celsius.

At 820, the method 800 includes evaluating (e.g., again) the time until the start of the Sabbath condition. Specifically, following the start or initiation of 818, 820 may include determining if the Sabbath will (i.e., is anticipated to) begin within a third time period (e.g., as measured in hours, such as 1 hour) that is less than the first or second time period(s). If the Sabbath will not occur within the second time period from 820, the controller may return to 818. In other words, the method 800 may maintain the mixing valve at the Sabbath set-point temperature before repeating 820. If the Sabbath will (i.e., is anticipated to begin) within the third time period, the method 800 may proceed to 822.

At 822, the method 800 includes holding the heating elements in an inactive state (e.g., in response to 822). Thus, 822 may include preventing or otherwise restricting heat generation within the interior volume of the tank. For instance, the lower heating element or the upper heating element may be deactivated or otherwise held in an inactive state (e.g., simultaneously). Moreover, the prevention of heat generation may begin prior to the start of the Sabbath (e.g., within the third time period, such as an hour prior to the start of the Sabbath).

At 824, the method 800 includes determining a start of the Sabbath condition. Specifically, it may be determined that the Sabbath has started at a particular moment. Optionally, the determination at 824 may be made automatically according to a preset geographic location for the water heater appliance. In some embodiments, the geographic location may correspond to the current physical location of the water heater appliance. Moreover, the geographic location may be automatically determined (e.g., by a global positioning satellite unit within the controller) or manually specified by a user (e.g., as a zip code, city and state, latitude and longitude, etc.). Along with the geographic location, it is understood that determining a start Sabbath condition includes monitoring the current time (e.g., as maintained at a clock within the controller) and comparing that current time to a programmed Jewish calendar. In turn, 824 may include determining a Sabbath start time and a Sabbath end time. At 824, the method 800 may further include comparing the current time to the determined Sabbath start (e.g., continuously or at a predetermined interval) and determining that the current time meets or exceeds or the Sabbath start time (e.g., without exceeding the determined Sabbath stop time). In some embodiments, 824 is further based on sun data, such as a sunrise time and a sunset time (e.g., as received from a remote server or website).

Once it is determined that the Sabbath has started, an inactivity timer may be initiated to count the time that passes after the start time of the Sabbath (e.g., prior to the Sabbath ending). Thus, the inactivity timer may track or record how much time has passed since the Sabbath started. For instance, the inactivity timer may track the time for which the Sabbath condition has been present relative to a maximum time period (e.g., measured in hours, such as 24 hours) programmed with the inactivity timer.

At 826, the method 800 includes evaluating the completion of the Sabbath condition. In other words, 826 includes determining if the stop time of the Sabbath has been met or exceeded. If the Sabbath Condition has ended (i.e., completed or expired), the method 800 may proceed to 828. If not, the method 800 may proceed to 829.

At 828, the method 800 includes initiating a non-Sabbath mode at the determined Sabbath end time. The Sabbath mode may thus be discontinued as the non-Sabbath mode is initiated (e.g., for a typical, non-Sabbath cycle).

At 829, the method 800 includes maintaining output water at a compliant temperature (e.g., below 45 degrees Celsius) during the Sabbath condition. As shown, 829 may include evaluating the Sabbath compliance of the tank. For instance, 829 may include determining if water within the lower portion of the tank is at or below the sub-cooking Sabbath temperature (e.g., as measured at the lower temperature sensor). If so, the tank may be at a Sabbath-compliant state; if not, the tank may be in a non-compliant state. Additionally or alternatively, 829 may include determining if water within the upper portion of the tank is at or below the stratified Sabbath temperature (e.g., as measured at the upper temperature sensor). If so, the tank may be at a Sabbath-compliant state; if not, the tank may be in a non-compliant state.

If it is determined that the tank is in a non-compliant state (i.e., is not determined to be in a Sabbath-compliant state based on one or more temperature measurements from the first tank temperature sensor or the second tank temperature sensor), the mixing valve may be moved to a fully open position. Thus, all or most of water exiting the mixing valve and flowing to the mixed water conduit may be relatively cold water (e.g., as described above). After the mixing valve is directed to the fully open position, the method 800 may repeat evaluating the Sabbath compliance of the tank (e.g., until the tank is determined to be in a Sabbath-compliant condition or the Sabbath ends). In response to a determination that the tank is in a Sabbath-compliant state, the method 800 may proceed to 830.

At 830, the method 800 includes evaluating the inactivity timer. Specifically, 830 may include determining if the maximum time period has expired. For instance, the controller may detect may if the Sabbath condition continues past than the maximum time period. This may be the case if, for instance, a religious holiday follows immediately after a weekly Sabbath condition. If the maximum time period has not expired, the method 800 may return to 826 (e.g., to maintain the tank in the Sabbath-compliant state). If the maximum time period has expired, the method 800 may proceed to 832.

At 832, the method 800 includes recharging the tank. For instance, water within the interior volume may be actively heated (e.g., until one or more Sabbath-compliant conditions are met). In some embodiments, in response to the maximum time period expiring, one or more of the heating elements may be reactivated to recharge the tank. Specifically, the lower portion of the tank may be redirected to the sub-cooking Sabbath temperature. Additionally or alternatively, the upper portion of the tank may be redirected to the stratified Sabbath temperature. Thus, the water heater compliance may continue to provide hot water while maintaining compliance with religious requirements.

Once the tank has been recharged, the method 800 may return to 826 (e.g., to maintain the tank in the Sabbath-compliant state), and the subsequent/dependent steps may be repeated (e.g., until the Sabbath condition expires).

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of operating a water heater appliance, the method comprising:
    determining an anticipated Sabbath condition at the water heater appliance;
    directing a lower portion of a tank of the water heater appliance to a sub-cooking Sabbath temperature below 45 degrees Celsius based on the anticipated Sabbath condition;
    determining the sub-cooking Sabbath temperature is met at the lower portion of the tank;
    directing a mixing valve of the water heater appliance to a Sabbath set-point temperature in response to determining the sub-cooking Sabbath temperature is met at the lower portion of the tank; and
    directing an upper portion of the tank of the water heater appliance to a stratified Sabbath temperature above the sub-cooking Sabbath temperature.

2. The method of claim 1, wherein determining the anticipated Sabbath condition comprises determining a predetermined time until a start of the anticipated Sabbath condition.

3. The method of claim 2, wherein the predetermined time is equal to or greater than 24 hours.

4. The method of claim 1, further comprising directing the mixing valve to a fully open position based on the anticipated Sabbath condition prior to determining the sub-cooking Sabbath temperature is met at the lower portion of the tank.

5. The method of claim 1, further comprising holding a heating element in an inactive state subsequent to the directing the mixing valve of the water heater appliance to the Sabbath set-point temperature.

6. The method of claim 5, wherein the heating element is a lower heating element, and wherein the method further comprises holding a upper heating element in an inactive state simultaneously with the lower heating element.

7. The method of claim 1, further comprising:
    detecting expiration of a maximum inactive period from a start point of the anticipated Sabbath condition; and
    redirecting the lower portion of the tank to the sub-cooking Sabbath temperature in response to determining expiration of the maximum inactive period.

8. The method of claim 1, further comprising determining a predetermined conditional time until a start of the anticipated Sabbath condition, wherein directing the mixing valve of the water heater appliance is further conditioned on determining the predetermined conditional time.

9. A water heater appliance comprising
    a casing;
    a tank disposed within the casing, the tank defining an inlet and an outlet;

an inlet conduit mounted to the tank at the inlet of the tank;

an electric heating system in thermal communication with the tank to heat water within the tank;

a mixing valve mounted to the casing downstream from the tank; and a controller operably coupled to the electric heating system and the mixing valve, the controller being configured to initiate a Sabbath cycle, the Sabbath cycle comprising determining an anticipated Sabbath condition at the water heater appliance, directing a lower portion of the tank of the water heater appliance to a sub-cooking Sabbath temperature below 45 degrees Celsius based on the anticipated Sabbath condition, determining the sub-cooking Sabbath temperature is met at the lower portion of the tank, directing a mixing valve of the water heater appliance to a Sabbath set-point temperature in response to determining the sub-cooking Sabbath temperature is met at the lower portion of the tank, and directing an upper portion of the tank of the water heater appliance to a stratified Sabbath temperature above the sub-cooking Sabbath temperature.

10. The water heater appliance of claim 9, wherein determining the anticipated Sabbath condition comprises determining a predetermined time until a start of the anticipated Sabbath condition.

11. The water heater appliance of claim 10, wherein the predetermined time is equal to or greater than 24 hours.

12. The water heater appliance of claim 9, wherein the Sabbath cycle further comprises directing the mixing valve to a fully open position based on the anticipated Sabbath condition prior to determining the sub-cooking Sabbath temperature is met at the lower portion of the tank.

13. The water heater appliance of claim 9, wherein the electric heating system comprises a heating element disposed on the tank, and wherein the Sabbath cycle further comprises holding the heating element in an inactive state subsequent to the directing the mixing valve of the water heater appliance to the Sabbath set-point temperature.

14. The water heater appliance of claim 13, wherein the heating element is a lower heating element, wherein the electric heating system further comprises an upper heating element disposed on the tank above the lower heating element, and wherein the Sabbath cycle further comprises holding the upper heating element in an inactive state simultaneously with the lower heating element.

15. The water heater appliance of claim 9, wherein the Sabbath cycle further comprises detecting expiration of a maximum inactive period from a start point of the anticipated Sabbath condition, and redirecting the lower portion of the tank to the sub-cooking Sabbath temperature in response to determining expiration of the maximum inactive period.

16. The water heater appliance of claim 9, wherein the Sabbath cycle further comprises determining a predetermined conditional time until a start of the anticipated Sabbath condition, and wherein directing the mixing valve of the water heater appliance is further conditioned on determining the predetermined conditional time.

17. A method of operating a water heater appliance, the method comprising:

determining an anticipated Sabbath condition at the water heater appliance;

directing a lower portion of a tank of the water heater appliance to a sub-cooking Sabbath temperature below 45 degrees Celsius based on the anticipated Sabbath condition;

determining the sub-cooking Sabbath temperature is met at the lower portion of the tank;

directing a mixing valve of the water heater appliance to a Sabbath set-point temperature in response to determining the sub-cooking Sabbath temperature is met at the lower portion of the tank; and directing the mixing valve to a fully open position based on the anticipated Sabbath condition prior to determining the sub-cooking Sabbath temperature is met at the lower portion of the tank.

18. The method of claim 17, wherein determining the anticipated Sabbath condition comprises determining a predetermined time until a start of the anticipated Sabbath condition.

19. The method of claim 17, further comprising holding a heating element in an inactive state subsequent to the directing the mixing valve of the water heater appliance to the Sabbath set-point temperature.

20. The method of claim 17, further comprising:

detecting expiration of a maximum inactive period from a start point of the anticipated Sabbath condition; and redirecting the lower portion of the tank to the sub-cooking Sabbath temperature in response to determining expiration of the maximum inactive period.

* * * * *